（12）United States Patent
Atwell et al.

US010024534B2

(10) Patent No.: US 10,024,534 B2
(45) Date of Patent: Jul. 17, 2018

(54) STABILIZATION OF SODIC FLY ASH OF TYPE F USING CALCIUM-BASED MATERIAL

(71) Applicant: SOLVAY SA, Brussels (BE)

(72) Inventors: Michael Atwell, Cherryville, NC (US); Rasik H. Raythatha, Kingwood, TX (US)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 15/315,863

(22) PCT Filed: Jun. 3, 2015

(86) PCT No.: PCT/US2015/033905
§ 371 (c)(1),
(2) Date: Dec. 2, 2016

(87) PCT Pub. No.: WO2015/187781
PCT Pub. Date: Dec. 10, 2015

(65) Prior Publication Data
US 2017/0089573 A1 Mar. 30, 2017

Related U.S. Application Data

(60) Provisional application No. 62/007,922, filed on Jun. 4, 2014, provisional application No. 62/029,418, filed on Jul. 25, 2014, provisional application No. 62/029,416, filed on Jul. 25, 2014.

(51) Int. Cl.
| | |
|---|---|
| *F23J 15/02* | (2006.01) |
| *A62D 3/33* | (2007.01) |
| *C04B 18/08* | (2006.01) |
| *C04B 20/10* | (2006.01) |

(52) U.S. Cl.
CPC ............ *F23J 15/02* (2013.01); *A62D 3/33* (2013.01); *C04B 18/08* (2013.01); *C04B 20/1085* (2013.01)

(58) Field of Classification Search
CPC ............ F23J 2215/00; F23J 2215/10; F23J 2215/101; F23J 2215/20; F23J 2215/30; F23J 2215/301; F23J 2215/40; F23J 2215/50; F23J 2215/60; F23J 15/00; F23J 15/003; F23J 15/006; F23J 15/02; F23J 15/022; F23J 15/025; F23J 15/027; F23J 15/04; F23J 15/06; F23J 15/08; F23J 99/00; A62D 3/30; A62D 3/32; A62D 3/33; A62D 3/34; A62D 3/35; A62D 3/36; A62D 3/37; A62D 3/38; A62D 3/40
See application file for complete search history.

(56) References Cited

U.S. PATENT DOCUMENTS

| | | | |
|---|---|---|---|
| 3,962,080 A | 6/1976 | Dulin | |
| 4,354,876 A | 10/1982 | Webster | |
| 4,397,801 A | 8/1983 | Minnick | |
| 4,407,677 A * | 10/1983 | Wills, Jr. .............. | C04B 18/162 |
| | | | 106/716 |
| 4,481,172 A | 11/1984 | Lowell et al. | |
| 5,152,837 A | 10/1992 | Rademaker | |
| 5,540,902 A | 7/1996 | De Soete et al. | |
| 5,626,552 A | 5/1997 | Nomura | |
| 6,001,152 A | 12/1999 | Sinha | |
| 6,171,567 B1 | 1/2001 | Fagiolini | |
| 6,319,482 B1 | 11/2001 | Sawell et al. | |
| 7,481,987 B2 | 1/2009 | Maziuk, Jr. | |
| 7,854,911 B2 | 12/2010 | Maziuk, Jr. | |
| 8,177,906 B2 | 5/2012 | Boxley | |
| 2005/0049449 A1 | 3/2005 | Forrester | |
| 2009/0229492 A1 | 9/2009 | Mills | |

FOREIGN PATENT DOCUMENTS

| | | |
|---|---|---|
| CA | 2874325 A1 | 11/2013 |
| CN | 1686853 A | 10/2005 |
| EP | 2429685 B1 | 5/2014 |
| GB | 778968 A | 7/1957 |
| WO | WO0029095 A1 | 5/2000 |
| WO | WO2014086921 A1 | 6/2014 |

(Continued)

OTHER PUBLICATIONS

Pflughoeft-Hassett, et al., Characteristics and Performance of Fly Ash from Sodium Sorbent Scrubbing of SO3 Emissions from Coal-Based Power Plants, 2009 World of Coal Ash (WOCA) Conference—May 4-7, 2009, accessed online at http://www.flyash.info/2009/123-pflughoeft2009.pdf on Sep. 28, 2017.* ASTM 0311.*
Dardjito, et al., Fly ash-based geopolymer concrete, Australian Journal of Structural Engineering 2005; 16(1): 1-10.*
Standard Specification for Coal Fly Ash and Raw or Calcined Natural Pozzolan for Use in Concrete , ASTM International C618-15.
Electric Power Research Institute Report No. 1017577 (2010) entitled "Impacts of sodium based reagents on coal combustion product characteristics and performance".
European Standard NF EN 12457-2 (Dec. 2002).

(Continued)

*Primary Examiner* — Daniel C McCracken
(74) *Attorney, Agent, or Firm* — Beatrice C. Ortego

(57) ABSTRACT

A treatment method for stabilizing a sodic fly ash to reduce their leachability which is provided by a combustion process when a sodium-based sorbent comes in contact with a flue gas generated by combustion to remove at least a portion of pollutants contained in the flue gas. The treatment method comprises contacting the sodic fly ash with at least one additive comprising calcium. The material obtained from the contacting step is preferably dried. The material may be selected from the group consisting of lime kiln, dust, fine limestone, quicklime, hydrated lime, dolomitic lime, dolomite, selectively calcined dolomite, hydrated dolomite, and any mixture of two or more thereof. A particularly preferred additive comprises lime kiln dust.

20 Claims, No Drawings

(56) References Cited

FOREIGN PATENT DOCUMENTS

WO     WO2015187778 A1    12/2015
WO     WO2015187780 A1    12/2015

OTHER PUBLICATIONS

EPA Test Method 1311—TCLP, Toxicity Characteristic Leaching Procedure, American Standard, from EPA Manual SW 846, Jul. 1992.

Su et al.; "Impact of trona based SO2 control on the elemental leaching behaviour of flyash"; Energy fuels, 2011, vol. 25, p. 3514-3521.

Dan et al.; "Increased leaching of As, Se, Mo and V from high calcium coal ash containing trona reaction products"; Energy fuels, 2013, vol. 27, p. 1531-1537.

U.S. Appl. No. 14/646,546, filed May 21, 2015, Rasik H. Raythatha et al.

U.S. Appl. No. 15/315,858, filed Dec. 2, 2016, Rasik H. Raythatha et al.

U.S. Appl. No. 15/315,860, filed Dec. 2, 2016, Rasik H. Raythatha et al.

\* cited by examiner

STABILIZATION OF SODIC FLY ASH OF TYPE F USING CALCIUM-BASED MATERIAL

CROSS-REFERENCE TO RELATED APPLICATIONS

The present application is a U.S. national stage entry under 35 U.S.C. § 371 of International Application No. PCT/US2015/033905 filed on Jun. 3, 2015, which claims priority to U.S. Provisional Application No. 62/007,922 filed Jun. 4, 2014 and to U.S. Provisional Applications No. 62/029,416 and No. 62/029,418, both filed Jul. 25, 2014, the whole content of each of these applications being incorporated herein by reference for all purposes.

TECHNICAL FIELD OF THE INVENTION

This invention relates to the stabilization of a sodic fly ash, wherein the sodic fly ash is provided in a combustion process utilizing a sodium-based sorbent pollution control system, particularly utilizing a dry sorbent comprising sodium carbonate, sodium bicarbonate, and/or sodium sesquicarbonate (or trona) in a coal combustion process for power generation.

BACKGROUND OF THE INVENTION

Emissions regulations in the United States have resulted in changes to coal-based electric generating plants through the addition of emission controls.

During combustion of coal in coal-fired systems, combustion products/byproducts are generated and entrained in exhaust gases, sometimes referred to flue gases. These combustion byproducts include fly ash comprising lightweight particulate matter; and gaseous compounds such as sulfur dioxide ($SO_2$), sulfur trioxide ($SO_3$), hydrochloric acid (HCl), and hydrofluoric acid (HF). These gaseous combustion byproducts may become air pollutants if emitted to the atmosphere. Control of $SO_2/SO_3$ emissions (commonly referred to as 'SOx' emissions) and HCl/HF emissions requires removal of these gaseous compounds from flue gases prior to release of the flue gases into the environment. Many materials have been employed to treat the flue gases. The physical nature of these materials varies from wet scrubbing to injection of dry powdered materials and is dependent upon the overall pollution control process system employed.

The gaseous combustion byproducts are generally acidic, and thus slurries or dry materials used to remove ("scrub") them from the flue gases are alkaline. Wet removal systems (referred to as 'scrubbers') used for flue gas desulfurization typically utilize aqueous slurries of lime-based reagents (e.g., calcium oxide) or limestone to neutralize the sulfurous and/or sulfuric acids produced from the dissolution and subsequent oxidation of flue gas in scrubbers. The reaction taking place in wet scrubbing of $SO_2$ using a $CaCO_3$ (limestone) slurry or a lime-based slurry ($Ca(OH)_2$) produces $CaSO_3$ (calcium sulfite).

When using wet scrubbers employing limestone slurries or lime-based reagents, large volumes of waste product are produced and must be hauled away for disposal. Such practice is common among power plants located in areas where landfill space is abundant or is a cost-effective disposal alternative.

With $SO_2$ control for NAAQS, CSAPR, Regional Haze, consent orders, and permits becoming more widespread at facilities not well suited for wet scrubbing, dry sorbent injection (DSI) technology with sodium sorbents represents a cost effective solution. Ash leachate issues are a concern and while many users have no difficulty landfilling ash with high sodium content, there are some situations where ash treatment could be beneficial.

Recently, other alkali materials have gain acceptance in lieu of or in addition of lime-based reagents and limestone which offer flexibility and versatility in the operation of emission controls, maintenance and waste disposal requirements of flue gas desulfurization scrubber systems. These other materials are typically more expensive, but also more efficient, than lime and limestone and are more often used:
1. where the volume of waste gas to be treated is small (compared to those from large power plants);
2. where other factors such as transportation cost of the alkali material is economical;
3. where required or necessitated by local or regional regulatory constraints; or
4. where any combination of these and other economic, technical, or regulatory issues make this alternative economically and environmentally viable.

Some of these alternative alkali materials used in flue gas treatment are dry sodium-based sorbents which include sodium carbonate ($Na_2CO_3$), sodium bicarbonate ($NaHCO_3$), sodium sesquicarbonate ($Na_2CO_3 \cdot NaHCO_3 \cdot 2H_2O$), combinations thereof, or minerals containing them such as trona, nahcolite.

Trona, sometimes referred to as sodium sesquicarbonate ($Na_2CO_3 \cdot NaHCO_3 \cdot 2H_2O$) due to its high content in sodium sesquicarbonate (typically 70-99 wt %), is a natural mineral and is receiving increased widespread use in dry flue gas treatment systems. Nahcolite, sometimes referred to as sodium bicarbonate ($NaHCO_3$), is also a natural mineral which may be used in dry or slurry flue gas treatment systems.

For dry sorbent injection, dry powdered sodium-containing sorbent (such as particulate trona or sodium bicarbonate) is injected into an air duct through which a flue gas stream (containing combustion solid matter and gaseous acidic combustion byproducts) flows. The acidic gases and the sodium-containing sorbent (e.g., trona or sodium bicarbonate) react to form treatment byproducts. The solid components of the treated flue gas including combustion solid matter, treatment by-products (which may be solid sodium salts and/or may be adsorbed/absorbed on the combustion solid matter), and optionally any unreacted sodium-containing sorbent (when a stoichiometric excess is used) are removed from the flue gas stream using a particulate recovery system such as one or more baghouse filters or preferably one or more electrostatic precipitators (ESP) to collect solids referred to as a 'sodic fly ash' and to recover a DSI-treated flue gas stream which may be further subjected to a wet scrubber to further remove remaining acid gaseous combustion byproducts.

One example of a flue gas desulfurization treatment using a sodium-based dry sorbent injection technology is described in U.S. Pat. No. 7,854,911 by Maziuk. Maziuk describes the chemical reaction of trona with $SO_2$, which unlike sodium bicarbonate, melts at elevated temperatures. According to Maziuk, trona (mainly sodium sesquicarbonate) undergoes rapid calcination of contained sodium bicarbonate to sodium carbonate when heated at or above 275° F. Maziuk suggests that the "popcorn like" decomposition creates a large and reactive surface by bringing unreacted sodium carbonate to the particle surface for $SO_2$ neutralization. The byproduct of the reaction is sodium sulfate and is collected in the fly ash. The chemical reaction of the trona with the $SO_2$ is represented below:

$$2[Na_2CO_3.NaHCO_3.2H_2O] \rightarrow 3Na_2CO_3 + 5H_2O + CO_2$$

$$Na_2CO_3 + SO_2 \rightarrow Na_2SO_3 + CO_2$$

$$Na_2SO_3 + 1/2O_2 \rightarrow Na_2SO_4$$

Other reactions with trona when injected into flue gas of a coal-fired power plant, may include a reaction with hydrochloric acid according to the following:

$$[Na_2CO_3.NaHCO_3.2H_2O] + 3HCl \rightarrow 3NaCl + 4H_2O + 2CO_2$$

The solid reaction products of the trona and the acid gases (e.g., $SO_2$, $SO_3$, HF, HCl) which are primarily sodium salts (e.g., sodium sulfate, sodium sulfite, sodium fluoride, and/or sodium chloride) as well as unreacted sodium carbonate are then collected in one or more particulate collection devices, such as baghouse filter(s) or electrostatic precipitator(s).

For example, trona may be maintained in contact with the flue gas for a time sufficient to react a portion of the trona with a portion of the $SO_3$ to reduce the concentration of the $SO_3$ in the flue gas stream. For $SO_3$ removal, the total desulfurization is preferably at least about 70%, more preferably at least about 80%, and most preferably at least about 90%.

Whenever possible, fly ash resulting from the combustion of coal ('coal fly ash') which is collected from the particulate recovery system may be used in various applications; otherwise dry fly ash is disposed into a landfill. Typical coal fly ash is mainly composed by aluminosilicates partially vitrified, as well as mineral phases such as quartz, hematite, maghemite, anhydrite and so on which had been present as impurities in the original coal. Sodic fly ash further comprises spent sodium-based sorbent.

ASTM C 618-85 ("Standard specification for fly ash and raw calcinated natural pozzolan for use as a mineral admixture in Portland cement concrete") has classified fly ash into two classes, Class C and Class F, depending on the total sum of silica, alumina and ferric oxide present. Class F contains more than 70 percent of the above oxides and Class C contains less than 70 percent but more than 50 percent. Class F fly ash is typically low in calcium oxide (<8 percent) whereas Class C has a higher content being sub-classified in two categories: Class Cl (8-20 percent CaO) and Class CH (>20 percent CaO). Therefore, Class F fly ash is not usually considered as a cementitious material by itself because, due to its low calcium oxide content, it cannot be agglomerated after hydration to produce bonding strength in the final product, contrary to Class C fly ash.

Fly ash is a by-product that has to be used and consumed to reduce its environmental impact. Nowadays, it has mainly been used as a partial substitute in ordinary Portland cement due to its pozzolanic reactivity. However, there is a limitation in the replaced quantity because the pozzolanic reaction rate is very low at room temperature causing initial low strength and fast neutralization.

In 2006, U.S. coal-fired power plants have generated 72 million tons of fly ashes. Almost 45% of these solid residues (32 million tons) are used in a dozen of applications. According to AMERICAN COAL ASH ASSOCIATION, "2006 Coal Combustion Product (CCP)—Production and Use Survey", among these applications, 15 million tons of fly ashes are used in concrete/concrete products/grout;

7 million tons of fly ashes are used in structural fills/embankments; and 4 million tons of fly ashes are used in cement/raw feed for clinker.

Sodic fly ashes resulting from flue gas acid gas removal treatment which predominately use powdered trona or sodium bicarbonate as sodium-based sorbent in DSI systems contain not only fly ash particles coated and intermixed with water-soluble sodium salts (e.g., sodium sulfite, sulfate, chloride, and/or fluoride) and unreacted sodium-based sorbent, but also contain various metallic compounds and other chemical attributes that may pose an environmental concern if the sodic fly ashes are placed in a landfill or used for beneficial re-use.

Even though trona or sodium bicarbonate use for acid gas removal from flue gases of coal-fired power plants has been helpful to address regulatory constraints in the United States, these sodium-based sorbents have modified the physical and chemical characteristics of the fly ashes with two consequences which are as follows:

the leaching of trace elements (such as Se, As, Mo) and soluble matter increases with sodium content and alkalinity: it raises the question of its impact on the environment (environmental storage management, surface and ground water quality, human health . . . ), and the high content of water-soluble sodium salts may certainly prevent from the possible valorization of the sodic fly ashes into concrete if done without any further treatment (Standard ASTM-C-618: as a pozzolanic additive, fly ash must not content more than 1.5 wt % of $Na_2O$) and also raises the issue of its storage.

Resulting from the introduction of the sodium-based sorbent, some water-soluble sodium-heavy metal complexes, compounds, and the like, may be formed, when heavy metals contained in the flue gas get in contact with the sodium-based sorbent. As the formation of water-soluble matter with fly ash trace elements (such as Se) increases with sodium content, so does the leachability of some of these trace elements from the sodic fly ash.

In an Electric Power Research Institute Report No. 1017577 (2010) entitled "Impacts of Sodium-based Reagents on Coal Combustion Product Characteristics and Performance", it was reported that greater than 50% of the sodium leached in all leachates from the sodium-based reagent coal combustion product samples (CCP) while less than 15% of the sodium leached from standard CCP samples. This indicates that the added sodium was more mobile than the inherent sodium from the coal in the standard CCPs. It was also remarked that selenium and arsenic were generally more mobile in the leachates from CCP samples with sodium-based sorbent injection than in the standard CCP samples. It was noted that the highest vanadium leachate concentrations in the sample set were from the CCP sample with sodium carbonate injection.

Jianmin Wang and coworkers also studied the impact of trona injection on the characteristic of the resulting fly ash and on the leaching characteristics of anionic elements, including As, Se, Mo, and V.

In Su et al., "Impact of Trona-Based $SO_2$ Control on the Elemental Leaching Behavior of Fly Ash" *Energy Fuels,* 2011, Vol. 25, pg. 3514-3521, and in Dan et al, "Increased Leaching of As, Se, Mo, and V from High Calcium Coal Ash Containing Trona Reaction Products" *Energy Fuels,* 2013, vol. 27, pp 1531-1537, it was shown that trona injection and subsequent capture of the reaction products with fly ash significantly enhanced the leaching of As, Se, Mo, and V. Their results also indicated that, with trona addition, the distribution of these anions shifted to the soluble trona fraction of the ash. Therefore, the dissolution of the spent trona sorbent resulted in more leaching of these anionic elements. In addition, they found that trona injection significantly reduced the adsorption capability of the insoluble fraction of the ash for As, Se, and V under the natural pH, and made them more leachable. For use in cement and concrete applications, a number of strategies have been developed over the last 50 or more years for effectively designing concrete with pozzolans such as coal fly ash. A pozzolan is broadly defined as an amorphous or glassy silicate or aluminosilicate material that reacts with calcium hydroxide formed during the hydration of Portland cement in concrete to create additional cementitious material in the form of calcium silicate and calcium silicoaluminate hydrates. However it has been established that pozzolans must be low in alkalis ($Na_2O$ and $K_2O$), to avoid long-term durability problems in concrete by expansion due to alkali-silica reactions.

If the valorization (such as use in cement and concrete) or landfilling of a sodic fly ash may be problematic due to high sodium content and leachability of some heavy metals result in exceeding the maximum allowed content limits in leachates set by local, state and/or federal regulations for leaching, the sodic fly ash may need to be processed to satisfy these requirements for valorization or landfill.

At an industrial scale, a wet treatment of sodic fly ash would include solubilization of water-soluble components from the sodic fly ash (which are mostly spent sorbent with unreacted sorbent and pollutants' reaction by-products), a liquid/solid separation and a subsequent treatment of leachates with high levels of Na, sulfate, carbonate, hydroxide, and some heavy metals (particularly selenium, arsenic and molybdenum). But this approach displaces the fly ash disposal issue to a wastewater management issue.

The primary leachate concerns are selenium and arsenic. The proposed Effluent Limitation Guidelines (ELG) propose leachate water limits for arsenic of 8 μg/L single day and 6 μg/L on a 30-day rolling average. For selenium, the leachate water limits are 16 μg/L for a single day and 10 μg/L on a 30-day rolling average.

In particular, if the leachate in an untreated trona-based fly ash provided by coal combustion may generate a leachate with a content in selenium (Se) or arsenic (As) above the regulatory limits, such sodic coal fly ash must be treated prior to land disposal or beneficial re-use.

The Resources Conservation and Recovery Act (RCRA) of 1976 is the principal federal law in the United States governing the disposal of solid waste and hazardous waste. The maximum acceptable leachate concentration for selenium into a RCRA Subtitle D landfill is one (1) mg/L; and the maximum acceptable leachate concentration for arsenic into a RCRA Subtitle D landfill is five (5) mg/L. Fly ashes that exceed these limits would be classified as hazardous wastes and be more expensive to landfill. In these cases it would be cost effective to treat the fly ash to avoid the hazardous classification and reduce disposal costs.

Selenium in particular is a difficult metal to treat because selenium (Se) exhibits a variety of oxidation states. In an alkaline environment under slightly oxidizing conditions, the selenate ($Se^{+4}$, $SeO_4^{-2}$) ion predominates. Conversely, in an acidic environment that is still oxidizing, the selenite ($Se^{+3}$, $SeO_3$) ion predominates. Selenate is significantly mobile in soils with little adsorption of the selenate ion over a pH range of 5.5-9.0. Therefore, selenium mobility is favored in oxidizing environments under alkaline conditions. As a result, the concentration and form of selenium is governed by pH, redox, and matrix composition (e.g., soil, ash) and makes short term and long term treatment difficult in various environments, but particularly difficult for sodic fly ash at elevated pH when excess sodium-based sorbent such as trona ($Na_2CO_3 \cdot NaHCO_3 \cdot 2H_2O$) is used in flue gas treatment. Reported pH for sodic fly ashes has been from about 10.5 to about 12.8.

Water-soluble heavy metal compounds (such as selenate and/or selenite) may be detrimental if they leach from the fly ash. Sodium salts leaching from a landfill usually are not hazardous, but the leaching of soluble materials from a landfill can impact the structural integrity of the pile and how the landfill is managed. Proctor tests provide some insight into density and moisture properties but do not measure how rain and other factors affect the physical characteristics of the landfill. Thus there is a need for more investigation and obtaining data from actual landfills.

Hence here lies a dilemma for the power plant operators. On one side, one needs to reduce the amounts of gaseous pollutants emitted by combustion processes (such as coal-fired power plants), while due to the nature of the fuel necessitating chemical treatments for pollutant control, there is an increased generation of combustion wastes containing heavy metals such as Se and As and resulting in an increase need in disposal or valorization of solid wastes obtained therefrom.

Additionally, if in order to address the increased leachability of some heavy metals (mostly oxyanions) from sodic fly ash, the wet processing approach is likely avoided since it results in dissolving the water-soluble components of fly ash (mostly spent sodium-based sorbent, reaction byproducts, and leachable heavy metals) and then in treating the resulting wastewater. One might have to envision a dry processing approach for stabilization of sodic fly ash. However, the handling of such dry material poses additional concern relating to fugitive dust. Dust control thus may need to be addressed and may become an integral part of such a stabilization method.

SUMMARY OF THE INVENTION

The present invention relates to a method for treating a sodic fly ash which is provided by a combustion process in which a sodium-based sorbent comes in contact with a flue gas generated by combustion to remove at least a portion of pollutants contained in the flue gas. The method for treating a sodic fly ash aims to stabilize such fly ash so as to reduce leachability therefrom of water-soluble metal containing compounds.

Such method is particularly useful for treating a fly ash generated in a coal-fired power plant.

The primary mechanism for stabilization of materials in a landfill is to initiate a pozzolanic reaction which typically requires calcium, silica and water. Class F fly ash originates from combustion of bituminous coal which has lower calcium content and a higher LOI than class C fly ash generally originating from combustion of Powder River Basin coals. Class C fly ash is higher in calcium content and more readily initiates pozzolanic reactions making it easier to stabilize than Class F ash. The addition of calcium or silica to ash in the presence of water should increase these reactions and bind the metals more tightly to the ash. In addition the formation of cementitious materials in the landfill would increase the structural strength of the pile and lessen the impact of sodium leachate.

In particular embodiments, the present invention relates to the treatment of a coal fly ash generated in a coal-fired power plant in which a dry sorbent is injected into a flue gas generated by combustion of coal in order to remove at least a portion of pollutants contained in the flue gas. The sorbent used for pollutants removal from the flue gas preferably comprises a sodium-containing sorbent, whereby the fly ash is a sodic fly ash which contains at least one sodium compound.

A particular aspect of the present invention relates to a method for stabilizing a sodic fly ash so as to reduce leachability therefrom of metal containing compounds, wherein the sodic fly ash is provided by a combustion process in which a sorbent comprising a sodium-containing sorbent is in contact with a flue gas generated during combustion to remove at least a portion of pollutants contained in the flue gas, such method comprising:

(a) contacting such sodic fly ash with at least one additive comprising calcium

The additive containing calcium may be selected from the group consisting of lime kiln dust, fine limestone, quicklime, hydrated lime, dolomitic lime, dolomite, selectively calcined dolomite, hydrated dolomite, and any mixture of two or more thereof.

A particular embodiment of the present invention relates to a method for stabilizing a sodic fly ash comprising contacting such sodic fly ash with lime kiln dust.

In such case, the material containing calcium may be added in an amount equal to or greater than 3% by weight based on the weight of the sodic fly ash, preferably in an amount equal to or greater than 4% by weight, more preferably in an amount equal to or greater than 5% by weight. The material containing calcium may be added in an amount equal to or less than 25% by weight, preferably equal to or less than 20 wt %, more preferably equal to or less than 15 wt %, most preferably equal to or less than 10 wt %. The added amount of the material containing calcium may range from 4 wt % to 20 wt %, preferably from 5 wt % to 15 wt %, most preferably from 5 wt % to 10 wt %.

The present method provides for a reduction in leachability of at least one heavy metal which is stabilized in the treated sodic fly ash.

The present method may also provide for a reduction in leachability of sodium which is stabilized in the treated sodic fly ash.

The method may further comprise: (b) drying the material obtained from the contacting step to form a dried matter.

The method may further comprise: washing the material obtained from the contacting step to form a washed matter.

In some embodiments, another (second) additive may be further used during contact with the Ca-containing additive or before or after such contact. The second additive may comprise a water-soluble source of silicate; a strontium-containing compound; a barium-containing compound; dolomite; an iron-containing compound (such as ferric sulfate, ferric chloride); or any combinations of two or more thereof.

In some additional or alternate embodiments, the method for stabilizing may further comprise: step (a') contacting the sodic fly ash with the Ca-containing additive after performing a contact with a second additive.

In some additional or alternate embodiments, the method for stabilizing may comprise: step (a") contacting the material resulting from contact with the Ca-containing additive with a second additive, said step (a") preferably being carried out before the drying step (b).

In some additional or alternate embodiments, the method for stabilizing may comprise: performing optional step (a') and step (a"). The second additive used in these two optional steps (a') and (a") may be the same or different.

In some embodiments when step (a') and/or step (a") are performed or when the second additive is contacted at the same time as the Ca-containing additive, the second additive may be selected from the group consisting of strontium-containing compounds; barium-containing compounds; a magnesium-containing material (such as magnesium hydroxide, magnesium carbonate, magnesium oxide); iron-containing compounds (such as ferric sulfate, ferric chloride); and any combinations of two or more thereof.

In some preferred embodiment, when the material containing calcium is selected from the group consisting of lime kiln dust, fine limestone, quicklime, hydrated lime, dolomitic lime, dolomite, selectively calcined dolomite, hydrated dolomite, and mixtures thereof, the second additive may comprise a material selected from the group consisting of magnesium hydroxide, magnesium carbonate, magnesium oxide and any mixtures thereof.

The sodic fly ash is preferably a sodic coal fly ash provided by a coal combustion process in which a dry sorbent comprising a sodium-containing sorbent is injected into the flue gas generated by coal combustion to remove at least a portion of pollutants (preferably acid gases, such as SOx, HCl, HF) contained in the flue gas.

The contacting may comprise mixing the sodic fly ash and the Ca-containing additive with optionally some water or an acidic solution; or may comprise mixing water or an acidic solution with a dry blend comprising the at least one Ca-containing additive in solid form and the sodic fly ash. The method may comprise dispersing, dissolving, or diluting the at least one second additive into water or an acidic solution to form an aqueous suspension, slurry or solution containing the at least one second additive before contacting, when contacting comprises mixing the resulting aqueous dispersion, slurry, or solution and said sodic fly ash or a dry blend of sodic fly ash and the Ca-containing additive and/or spraying the resulting aqueous dispersion, slurry, or solution onto said sodic fly ash or a dry blend of sodic fly ash and the Ca-containing additive. Misting may be used instead or in addition of spraying for an aqueous solution.

The method may comprise first dry mixing the at least one Ca-containing additive in solid form and the sodic fly ash to form a dry blend before contacting with a second additive. This embodiment is particular useful when the at least one Ca-containing additive is in solid form.

A preferred material containing calcium may be selected from the group consisting of lime kiln dust, fine limestone, quicklime, hydrated lime, dolomitic lime, dolomite, selectively calcined dolomite, hydrated dolomite, magnesium hydroxide, magnesium carbonate, magnesium oxide and any mixtures thereof. A preferred material containing calcium may be selected from the group consisting of lime kiln dust, fine limestone, quicklime, hydrated lime, dolomitic lime, dolomite, selectively calcined dolomite, hydrated dolomite, and any mixtures thereof. A more preferred material containing calcium may be selected from the group consisting of lime kiln dust, dolomitic lime, dolomite, selectively calcined dolomite, hydrated dolomite, and any mixture of two or more thereof. A most preferred material containing calcium may be selected from the group consisting of lime kiln dust, dolomitic lime, and any mixtures thereof. A particularly preferred material containing calcium is lime kiln dust.

When the second additive is sodium silicate, the contacting may comprise contacting the dry blend of sodic fly ash and the Ca-containing additive with sodium silicate with a sodium silicate content (based on the total weight of dry blend+sodium silicate+water) of at least 0.5 wt %, or of at least 0.8 wt %; or of at least 1 wt %; or more than 1 wt %. The sodium silicate content (based on the total weight of dry blend+sodium silicate+water) may be up to 10 wt %, preferably to 8 wt %, more preferably up to 6 wt %; yet more preferably with a sodium silicate content up to 5 wt %; yet most preferably with a sodium silicate content up to 2 wt %.

When the second additive comprises a solution containing sodium silicate, contacting the dry blend is carried out with a solution containing sodium silicate with a sodium silicate content of from 0.5 wt % up to 40 wt %, preferably a solution with a sodium silicate content of from 1 wt % up to 10 wt %, more preferably a solution with a sodium silicate content of from 1.5 wt % up to 6 wt %; yet more preferably a solution with a sodium silicate content of from 2 wt % up to 5 wt %.

Since commercially available silicate solutions may have a high silicate content (such as for example from about 30 to about 40 wt % for sodium silicate solution), the purchased source of silicate may be diluted with water or an acidic solution prior to contact with the dry blend of sodic fly ash and Ca-containing additive. Dilution should allow more homogeneous distribution of the water-soluble source of silicate onto the dry blend of sodic fly ash and Ca-containing additive and should provide more uniform contact between this additive and the sodic fly ash by more evenly coating the fly ash with the diluted silicate source.

A further aspect of the present invention thus provides a method for increasing the dry bulk density of sodic fly ash while minimizing water usage to control fly ash dusting. This method comprises performing the contacting step with the Ca-containing additive.

In this particular aspect, the method may include dispersing a second additive comprising sodium silicate onto a mass of sodic fly ash. When the source of sodium silicate is a concentrated sodium silicate solution (e.g., from 30 to 40 wt % sodium silicate), the method may include dilution of such concentrated sodium silicate solution with water or acidic aqueous medium and then applying the resulting diluted solution onto a mass of sodic fly ash or dry blend for an effective contact between sodium silicate and sodic fly ash. The contacting step preferably includes a spraying and/or misting technique. Spraying and/or misting may be carried out on a mass of sodic fly ash or dry blend while in motion such as on a conveyor belt. Spraying or misting may be carried out on a motionless mass of sodic fly ash or dry blend, such as a heap or a pile. Spraying and/or misting may be carried out with the help of nozzles to provide fine liquid droplets. Nozzle sizes, shapes, patterns and liquid flow rate can be varied to suit specific dust particle sizes and operating conditions.

The spraying and/or misting of the additive containing the silicate source (in form of a solution) not only permits uniform distribution of silicate on top of the fly ash or dry blend (thereby evenly coating the fly ash particles with this additive) to effect good contact for stabilization of at least some of the heavy metals contained in the sodic fly ash, and also controls dusting of the fly ash.

The addition of a water-soluble source of silicate to a sodic fly ash or dry blend thus may provide at least one of the following advantages:
 reducing the leachability of heavy metals (particularly Se and/or As) from the treated sodic fly ash;
 reducing the leachability of sodium from the treated sodic fly ash, when the treatment method also includes a contact of the sodic fly ash with a material containing Ca and/or Mg used as a second additive;
 controlling fly ash dusting, especially when the additive in a solution form is sprayed or misted onto a mass of sodic fly ash;
 reducing the optimal moisture content of the sodic fly ash; and/or
 increasing the dry density of the fly ash (resulting in less weight to dispose of in landfills).

The foregoing paragraphs have been provided by way of general introduction, and are not intended to limit the scope of the following claims. The presently preferred embodiments, together with further advantages, will be best understood by reference to the following detailed description.

DETAILED DESCRIPTION OF THE PREFERRED EMBODIMENTS

Definitions

The terms "heavy metals" as used herein, refer generally to elements including, for example, arsenic, selenium, antimony, beryllium, barium, cadmium, chromium, lead, nickel and zinc. As used herein, these terms encompass the elemental form of these metals as well as organic and inorganic compounds and salts containing them. Many of these elements and compounds thereof are harmful to human, animal and/or aquatic life.

The term "solubility" refers to the water solubility of a compound in water or an aqueous solution, wherein the water solubility is measured at 25° C. and 1 atmosphere, unless explicitly stated otherwise.

As used herein, the term 'additive' refers to a chemical additive.

As used herein, the term "trona" includes any source of sodium sesquicarbonate.

The term "flue gas" includes the exhaust gas from any sort of combustion process (including combustion of coal, oil, natural gas, etc.).

As used herein, the term "pollutants" in a flue gas includes acid gases such as $SO_2$, $SO_3$ (altogether typically termed SOx), HCl, HF, and $NO_x$ and some heavy metal-containing compounds which may be in a vaporized form.

As used herein, the term "sorbent" refers to a material which upon contact with a flue gas interacts with some of the flue gas constituents (such as pollutants) so as to remove at least some of them from the flue gas. Such interaction may include sorption of at least one flue gas constituent into or onto the sorbent and/or reaction between the sorbent and at least one flue gas constituent.

As used herein, the term 'spent sorbent' generally refers to the reaction mixture which is obtained in a dry sodium-based injection and which is collected in the fly ash material. The spent sorbent contains reaction products and byproducts (such as highly water-soluble sodium sulfate, sodium sulfite, sometimes sodium bisulfate), and also unconverted dry sorbent (such as sodium bicarbonate and/or sodium carbonate).

The term 'comprising' includes 'consisting essentially of' and also "consisting of".

A plurality of elements includes two or more elements.

The phrase 'A and/or B' refers to the following selections: element A; or element B; or combination of elements A and B (A+B).

The phrase 'A1, A2, . . . and/or An' with n≥3 refers to the following choices: any single element Ai (i=1, 2, . . . n); or any sub-combinations of from two to (n−1) elements chosen from A1, A2, . . . , An; or combination of all elements Ai (i=1, 2, . . . n). For example, the phrase 'A1, A2, and/or A3' refers to the following choices: A1; A2; A3; A1+A2; A1+A3; A2+A3; or A1+A2+A3.

In the present Application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements and/or features of processes or methods described herein can be combined in a variety of ways without departing from the scope and disclosure of the present teaching, whether explicit or implicit herein.

The use of the singular 'a' or 'one' herein includes the plural (and vice versa) unless specifically stated otherwise.

In addition, if the term "about" or "ca." is used before a quantitative value, the present teachings also include the specific quantitative value itself, unless specifically stated otherwise. As used herein, the term "about" or "ca." refers to a +−10% variation from the nominal value unless specifically stated otherwise.

Sodic Fly Ash

The fly ash which is treated in the method according to the present invention is preferably generated from a power plant, such as a coal-fired power plant. Such power plant preferably comprises one or more pollutants control processes and systems which by the use of sorbent(s) allow the removal of some pollutants from an exhaust gas (flue gas stream) generated from such power plant to meet regulatory requirements for gas emissions. When a sorbent used in a pollutants control process is sodium-based, the fly ash may be called a 'sodic' fly ash, particularly if the sodium content of the fly ash is greater than 1.5 wt % expressed as $Na_2O$. The pollutants in the flue gas generally include acid gases such as $SO_2$, $SO_3$, HCl, and/or HF. The pollutants in the flue gas may further include one or more heavy metals. The pollutants to be removed by the use of sorbent(s) are preferably $SO_2$ and/or $SO_3$; HCl; and optionally heavy metals such as mercury.

The fly ash is preferably generated by a coal-fired power plant employing at least one dry sorbent injection (DSI) technology in which at least one dry sorbent comprises or consists of one or more sodium-containing sorbents. In such process, the resulting coal fly ash contains one or more water-soluble sodium-containing compounds, such as sodium carbonate and/or sodium sulfate, and hence is preferably a 'sodic' coal fly ash. The sodium-containing sorbent which is used in the DSI technology to generate the sodic coal fly ash may be selected from the group consisting of sodium carbonate ($Na_2CO_3$), sodium bicarbonate ($NaHCO_3$), sodium sesquicarbonate ($Na_2CO_3.NaHCO_3.2H_2O$), sodium sulfite ($Na_2SO_3$), and any combinations thereof. Minerals containing one or combinations of these sodium compounds (such as trona, nahcolite) may be used instead of the compounds themselves.

The 'sodic' fly ash which is to be treated according to the present invention comprises at least one sodium compound. The at least one sodium compound in the sodic fly ash to be treated may be selected from the group consisting of sodium carbonate, sodium sulfate, sodium sulfite, sodium bisulfite, sodium bisulfate, sodium chloride, sodium fluoride, one or more sodium compounds comprising at least one heavy metal to be stabilized by the present method (such as selenium and/or arsenic), and combinations thereof. The main water-soluble sodium components of the sodic fly ash to be treated are generally sodium carbonate, sodium sulfate, and/or sodium chloride. The sodic fly ash before the contacting step preferably contains at least one sodium compound selected from the group consisting of sodium carbonate, sodium sulfate, sodium sulfite, sodium chloride, sodium fluoride, one or more sodium compounds containing selenium and/or arsenic, and combinations thereof.

The sodic fly ash to be treated may have a Na content greater than 1.5 wt % expressed as $Na_2O$, preferably equal to or greater than 2 wt % expressed as $Na_2O$. The sodic fly ash may have a Na content less than 50 wt % expressed as $Na_2O$, preferably equal to or less than 45 wt % expressed as $Na_2O$.

The sodic fly ash to be treated may have a high calcium oxide content, that is to say, equal to or greater than 8 wt %. This type of fly ash is typically classified as 'type C'.

The sodic fly ash to be treated may have a low calcium oxide content, such as less than 8 wt %. This type of fly ash is typically classified as 'type F'. This type of coal fly ash is particularly preferred in the treatment method according to the present invention.

In some embodiment, the sodic fly ash to be treated contains selenium in an amount of at least 1 ppm or at least 2 ppm. The Se content in the sodic fly ash to be treated may be from 1 ppm up to 100 ppm, or may be from 2 ppm up to 30 ppm.

In some embodiment, the sodic fly ash to be treated contains arsenic in an amount of at least 2 ppm. The As content in the sodic fly ash to be treated may be from 2 ppm up to 200 ppm.

At least a portion of selenium and/or arsenic contained in the sodic fly ash to be treated (e.g., more than 1 ppm Se) is leachable in deionized water or in dilute acidic solution if no treatment with the additive according to the present invention is carried out on the sodic fly ash.

In some embodiment, the sodic fly ash to be treated further comprises water-insoluble material comprising silicon and/or aluminum. The main water-insoluble components of the sodic fly ash to be treated may comprise silicon, aluminum, iron, and calcium measured as oxides.

A sodic fly ash to be treated may have a pH from about 10 to about 13, preferably a pH from about 10.5 to about 12.8.

Generating Sodic Fly Ash

Some embodiments of the present invention may further include a step of generating the sodic fly ash in a process for treating a gas containing acid gas pollutants, such as preferably $SO_x$, HCl, and/or HF.

The fly ash is preferably generated by a coal-fired power plant employing at least one dry sorbent injection (DSI) technology in which at least one dry sorbent comprises or consists of one or more sodium-containing sorbents.

A sodium-containing sorbent (e.g., trona or sodium bicarbonate) may be injected into a flue gas stream (e.g., generated in a coal-fired power plant), and the sodium-containing sorbent interacts with at least one of the pollutants to remove at least a portion of said pollutant(s). The injection is preferably taking place in a duct inside which the flue gas stream flows. In this process, it is recommended that the temperature of the flue gas stream is above 100° C., preferably above 110° C., more preferably above 120° C., most preferably above 130° C. At those temperatures, trona or sodium bicarbonate (or nahcolite) quickly decomposes into sodium carbonate having a high specific surface and thus high reactivity. The decomposition of these sodium-containing sorbents occurs within seconds upon exposure to such temperature, for example in the duct. The sorbent may be injected in the dry or semidry state. By 'semidry state injection' is understood to mean an injection of fine droplets of a water solution or preferably suspension of the sorbent (slurry) into a hot flue gas, having a temperature above 100° C. The solution or suspension evaporates immediately after its contact with the hot flue gas. The flue gas solids comprising products of the sorbent/pollutants interaction(s)—such as sorption and/or reaction(s)—can be recovered from the treated flue gas by one or more bag filters and/or one or more electrostatic precipitators to generate the sodic fly ash, a portion of which can be treated by the present method.

A suitable example for the use of sodium bicarbonate sorbent in the purification of a gas containing hydrogen chloride (such as flue gas from the incineration of household waste) may be found in U.S. Pat. No. 6,171,567 (by Fagiolini), incorporated herein by reference.

Another suitable example for the use of sodium bicarbonate in cleaning a gas containing sulfur dioxide and nitrogen monoxide (for example, fumes generated by the combustion of sulfur-containing fossil fuels, in electricity-producing power stations) may be found in U.S. Pat. No. 5,540,902 (by De Soete), incorporated herein by reference.

A suitable example for the use of trona sorbent in the purification of a gas containing sulfur dioxide may be found in U.S. Pat. No. 7,854,911 (by Maziuk), incorporated herein by reference.

A suitable example for the use of trona sorbent in the purification of a gas containing sulfur trioxide at a temperature from 500° F. to 850° F. may be found in U.S. Pat. No. 7,481,987 (by Maziuk), incorporated herein by reference.

Any of these pollutant control methods have the potential to generate a sodic fly ash which contains leachable heavy metals such as selenium and/or arsenic which may need to be treated according to the present invention to minimize Se leaching.

Preferably the coal ash is generated in the combustion of bituminous coal. Such fly ash typically is low in CaO content, such as less than 8 wt % CaO.

Contacting with at Least One Ca-containing Additive

The method according to the present invention comprises: contacting the sodic fly ash with at least one Ca-containing additive.

The contacting preferably comprise: 1/ first blending such sodic fly ash with the material containing calcium to make an initial blend, and then 2/ adding water to the resulting blend.

To make an initial blend, the blending of the sodic fly ash with the material containing calcium is preferably carried out by dry mixing. This embodiment is particular useful when the material containing Ca is in solid form.

The subsequent addition of the water to the resulting blend is preferably carried out by wet mixing.

When the Ca-containing additive is in powder or particulate form prior to contact with the sodic fly ash, its average particle size is generally less than 500 microns, preferably less than 250 microns, more preferably less than 150 microns. One of the advantages of a small particle size for a water-soluble additive is that the dissolution of such additive is faster in water. For this reason, the use of a particulate additive with submicron (e.g., nanosized) particles is also envisioned.

The material containing calcium may be selected from the group consisting of lime kiln dust, fine limestone, quicklime, hydrated lime, dolomitic lime, dolomite, selectively calcined dolomite, hydrated dolomite, and any mixture of two or more thereof. The material containing calcium may be preferably selected from the group consisting of lime kiln dust, dolomitic lime, dolomite, selectively calcined dolomite, hydrated dolomite, and any mixture of two or more thereof. A more preferred material containing calcium may be selected from the group consisting of lime kiln dust, dolomitic lime, and any mixture thereof. A most preferred material containing calcium may contain or may consist essentially of or may consist of lime kiln dust.

In such particular aspect, the material containing calcium may be added in an amount equal to or greater than 3% by weight based on the weight of the sodic fly ash, preferably in an amount equal to or greater than 4% by weight, more preferably in an amount equal to or greater than 5% by weight. The material containing calcium and/or magnesium may be added in an amount equal to or less than 25% by weight, preferably equal to or less than 20 wt %, more preferably equal to or less than 15 wt %, most preferably equal to or less than 10 wt %. The added amount of the material containing calcium and/or magnesium may range from 4 wt % to 20 wt %, preferably from 5 wt % to 15 wt %, most preferably from 5 wt % to 10 wt %.

Dolomite is a mineral ($CaCO_3.MgCO_3$) which contains equimolar amounts of calcium carbonate and magnesium carbonate; it generally contains a minimum of 97% total carbonate composition.

A dolomite derivative is a compound which is obtained by the partial or complete conversion of at least one or both carbonate components of dolomite to an oxide or hydroxide form. Non-limiting examples of dolomite derivatives includes dolomitic lime (also known as 'calcined dolomite'), selectively calcined dolomite, and/or hydrated calcined dolomite (also known as 'hydrated dolomite'). Dolomitic lime is typically resulting from calcination of dolomite. Depending on the calcination conditions used, a 'fully calcined dolomite' or a 'selectively calcined dolomite' may be obtained. Dolomitic lime typically refers to the 'fully calcined dolomite' in which the calcination of dolomite at a temperature in the range of 900-1200° C. produces from both of its carbonate components the corresponding oxides and $CO_2$ to give formula: CaO.MgO. Since the magnesium carbonate component in the dolomite decomposes to the oxide form and $CO_2$ at a lower temperature (ca. 600° C.) than calcium carbonate (ca. 900° C.), dolomite can be selectively calcined (e.g., ≥600 and <900° C.) to convert its magnesium component to the oxide form while keeping most of the calcium component in carbonate form thereby providing a 'selectively calcined dolomite' with an approximate formula $MgO.CaCO_3$. Hydrated dolomite is a product of slaking fully calcined dolomite, whereby calcium oxide is hydrated while magnesium oxide remains intact; hydrated dolomite therefore has an approximate formula $MgO.Ca(OH)_2$. A pulverized dolomitic lime (of micron-sized particles), also called 'DLP', is particularly suitable as a source for additive.

A particularly suitable optional additive component containing Mg and Ca may comprise, or may consist essentially of, or may consist of dolomite, dolomitic lime, hydrated dolomite, or any combination of two or more thereof.

Contacting with an Optional Additive

The method according to the present invention may further comprise comprises: contacting the sodic fly ash or the dry blend of sodic fly ash and the Ca-containing additive with at least one second additive.

A water-soluble source of silicate may be used as an optional second additive. The optional water-soluble source of silicate may comprise or consist of at least one water-soluble alkali earth metal-containing silicate compound. The alkali earth metal preferably is Na and/or K.

In the present invention, the water-soluble source of silicate used in the second additive preferably comprises at least one sodium silicate and/or at least one potassium silicate. More preferably, the water-soluble source of silicate comprises a sodium silicate.

A suitable source for sodium silicate may be crystalline sodium silicate in anhydrous or hydrate form. The molar $SiO_2/Na_2O$ ratio may vary, but are typically from 0.5 to 2.0. A suitable source for crystalline sodium silicate may be sodium metasilicate ($Na_2SiO_3$) also called water glass or soluble glass with a molar $SiO_2/Na_2O$ ratio of 1:1; sodium orthosilicate ($Na_4SiO_4$) with a molar $SiO_2/Na_2O$ ratio of 0.5:1; sodium pyrosilicate or sesquisilicate ($Na_6Si_2O_7$) with a molar $SiO_2/Na_2O$ ratio of 0.67; sodium disilicate ($Na_2Si_2O_3$) with a molar $SiO_2/Na_2O$ ratio of 2:1; or mixtures thereof.

A suitable source for sodium silicate may be a sodium silicate solution. Sodium silicate solutions may have any weight $SiO_2/Na_2O$ ratio, preferably a $SiO_2/Na_2O$ weight ratio from 1.5 to 4. Commercially available sodium silica solutions have typically a $SiO_2/Na_2O$ weight ratio from 1.6 to 3.25. Without wishing to be limited by any particular theory, since it is the silicate portion which is believed to impart the most stabilization for some of the heavy metals in the sodic fly ash, it is desirable to use a high $SiO_2/Na_2O$ weight ratio, such as a weight $SiO_2/Na_2O$ ratio of from about 2.4 to about 3.22.

Other optional second additive may be selected from the group consisting of at least one strontium-containing compound; at least one barium-containing compound; at least one iron-containing compound (such as ferric sulfate, ferric chloride); or any combinations of two or more thereof.

A particular second additive may comprise one or more sodium silicates and an optional additive component selected from the group consisting of at least one strontium-containing compound, ferric sulfate, ferric chloride; and any combinations of two or more thereof.

A suitable strontium-containing compound may comprise, or may consist of, strontium hydroxide, strontium chloride, strontium carbonate, or combinations of two or more thereof, preferably may comprise, or may consist, of strontium hydroxide and/or strontium chloride.

A suitable barium-containing compound may comprise, or may consist of, barium hydroxide and/or barium chloride.

A suitable additive for contacting with sodic fly ash preferably does not include silica sand or silica fume.

A particularly preferred optional second additive component may comprise, or may consist of, at least one compound selected from the group consisting of sodium silicate; strontium hydroxide, strontium chloride, ferric sulfate, ferric chloride, and any combinations of two or more thereof.

A particularly advantageous second additive to be used comprises odium silicate or a combination of sodium silicate with another additive component selected from the group consisting of strontium hydroxide, strontium chloride, ferric sulfate, ferric chloride, and any combinations thereof.

When the second additive is in powder or particulate form prior to contact with the sodic fly ash, its average particle size is generally less than 500 microns, preferably less than 250 microns, more preferably less than 150 microns. One of the advantages of a small particle size for a water-soluble additive is that the dissolution of such additive is faster in water. For this reason, the use of a particulate additive with submicron (e.g., nanosized) particles is also envisioned.

In some embodiments, the second additive does not contain a phosphate-containing compound and/or a phosphoric acid-containing compound. In particular, the additive preferably does not contain orthophosphoric acid or any of its alkali metal/alkali earth metal salts.

In some additional or alternate embodiments, the second additive does not contain a sulfide-containing compound, such as sodium sulfide $Na_2S$.

In some additional or alternate embodiments, the second additive further contain an iron-containing compound, such as ferric chloride, ferric sulfate $Fe_2(SO_4)_3$.

In other embodiments, the second additive does not contain an iron-containing compound, such as ferric chloride, ferric sulfate $Fe_2(SO_4)_3$.

In some additional or alternate embodiments, the second additive does not contain sodium oxide ($Na_2O$), calcium chloride, and/or ammonium chloride.

In preferred embodiments, the second additive excludes one compound selected from the group consisting of a phosphate-containing compound, a phosphoric acid-containing compound (including orthophosphoric acid or any of its alkali metal/alkali earth metal salts), a sulfide-containing compound, sodium oxide ($Na_2O$), calcium chloride, ammonium chloride, and an iron-containing compound, any sub-combination, and any combination thereof.

In alternate embodiments, the second additive contains an optional additive component selected from the group consisting of a phosphate-containing compound; a phosphoric acid-containing compound (including orthophosphoric acid or any of its alkali metal/alkali earth metal salts); a sulfide-containing compound; calcium chloride; ammonium chloride; and an iron-containing compound, such as ferric chloride, ferric sulfate $Fe_2(SO_4)_3$.

During contacting with sodic fly ash, it is preferred that no cementitious material (other than the sodic fly ash and possibly another coal fly ash) is used. That is to say, contacting is preferably not carried out in the presence of Portland cement or of a calcium sulfoaluminate cementitious material. The additive preferably excludes Portland cement or/and a calcium sulfoaluminate cementitious material.

The content of the second additive can vary over a wide range.

The amount of the second additive is preferably sufficient to achieve at least a 50%, or at least 60%, or at least 75%, reduction in leachability of at least one heavy metal (such as Se and/or As) from the sodic fly ash.

The amount of the second additive may be sufficient to achieve a reduction in leachability of at least one heavy metal (such as Se and/or As) from the treated material for the content of such heavy metal in the leachate not to exceed a maximum threshold value defined by local, state and/or federal environmental regulations. Leachability may be determined by leaching standards, such as European standard NF EN 12457-2 and American standard EPA 1311 from EPA Manual SW 486.

The amount of the second additive may be sufficient to achieve a leachability of Se from the treated material of 1 ppm or less.

The content of the water-soluble source of silicate is usually higher than or equal to 0.1 percent based on the weight of the sodic fly ash, preferably higher than or equal to 0.5 wt %, more preferably higher than or equal to 1 wt %, and most preferably higher than or equal to 2 wt %. The content of the water-soluble source of silicate is generally lower than or equal to 20 wt %, advantageously lower than or equal to 15 wt %, more advantageously lower than or equal to 10 wt %, and most advantageously lower than or equal to 5 wt %. A range from 2 wt % to 5 wt % for the water-soluble source of silicate is particularly advantageous. The amount of additive is based on the total weight of the sodic fly ash including its water-soluble fraction.

The molar ratio of the optional water-soluble source of silicate in the additive to the one or more heavy metals which is/are to be stabilized by the present method (such as selenium and/or arsenic) is typically higher than 1:1. The molar ratio of the water-soluble source of silicate in the additive to the one or more heavy metals to be stabilized may be at least 2:1, preferably from 2:1 to 100:1 or even more.

The contacting with sodic fly ash takes place in the presence of at least some water. Contacting does not include dry contact between the fly ash and any additive without presence of water. The sodic fly ash and at least one additive may be dry blended but in this instance, contacting is preferably initiated when water is added to the dry blend.

In some embodiments, the sodic fly ash is characterized by a liquid holding capacity. The amount of water used during contacting may be lower than the liquid holding capacity of said sodic fly ash. In alternate embodiments, the amount of water used during contacting may be equal to or higher than the liquid holding capacity of said sodic fly ash but not exceeding 75%. The amount of water used during contacting is preferably within +/−5 wt %, more preferably within +/−3 wt %, most preferably within +/−2 wt % of the liquid holding capacity of the sodic fly ash.

In some embodiments, the water content used during) is such that the material resulting is a soft malleable paste. The paste may contain at most 50 wt % water or even at most 40 wt % water, preferably at most 35 wt % water, more preferably may contain between 1 wt % and 35 wt % water. Alternate embodiments may include a water content between 20 wt % and 35 wt % water, or between 30 wt % and 35 wt % water.

In some embodiments, the contacting step is carried out under an acidic pH of from 3 to 7, or under near-neutral pH of from 6 to 8. Since a water-soluble sodium compound such as sodium carbonate is typically present in the sodic fly ash, the material obtained after contact with deionized water would have an alkaline pH (ca. 10-12); in such case, an acidic solution (e.g., a dilute HCl acidic solution) may be used instead of deionized water during the contacting step.

Various techniques for achieving contact between the sodic fly ash and the additive(s) may be used.

Mixing the additive(s) and the sodic fly ash, such as, without being limiting, kneading, screw mixing, stirring, or any combinations thereof may be used for contacting. Such mixing may be carried out in the presence of water. Spraying or misting an additive onto a mass of sodic fly ash may be an alternate or additional technique for contacting. Such spraying or misting may be carried out in the presence of water.

In some embodiments, the method may comprise first dry mixing the at least one additive in solid form (such as powder or granules) and the sodic fly ash to form a dry blend, and then adding water to such dry blend for initiating contacting.

Dry mixing (solid/solid mixing) may be carried out using a tumbling or convective mixer or any mechanical device in which a carrier liquid (e.g., water, organic solvent) is not required for mixing. A suitable tumbling mixer may be selected from the group consisting of a drum blender, a V-blender, a bin blender, and a double-cone blender. A suitable convective blender generally comprises a stationary vessel swept by a rotating impeller, and may be selected from the group consisting of a ribbon blender (a cylindrical vessel with a helical ribbon impeller mounted on a horizontal shaft), a paddle blender (a modified ribbon blender with paddles instead of a helical ribbon), a Nauta blender (a vertically oriented conical tank swept out by a rotating and precessing screw impeller), a Forberg mixer (two paddle blender drives sweeping two connected troughs), a Z-blade blender (a cylindrical vessel swept out by a Z-shaped blade), and a Lodige mixer (similar to a kitchen mixer where plough-shaped shovels rotate a cylindrical drum). The dry mixing of the at least one additive in solid form and the sodic fly ash is preferably carried out in a mixer selected from the group consisting of a ribbon blender and a V-blender.

In embodiments wherein the method comprises forming a dry blend containing the additive(s) (in solid form) and the sodic fly ash, the contacting step preferably comprises mixing water or an acidic solution with the dry blend. Such contacting step involves wet mixing.

In preferred embodiments of the present invention, the method may comprise first dispersing or dissolving or diluting the additive(s) into water or in an acidic solution to form an aqueous suspension, slurry or solution containing the additive(s) and then contacting the sodic fly ash with the resulting aqueous dispersion, slurry, or solution comprising the at least one additive. This contacting step may involve wet mixing, spraying, or combination of wet mixing and spraying. Misting an aqueous solution may be used instead of or in addition of spraying.

In embodiments wherein the method comprises forming an aqueous suspension, slurry or solution containing the additive(s), the contacting step preferably comprises mixing the sodic fly ash and the aqueous solution or slurry or suspension containing the additive(s) with optionally additional water or an aqueous medium (e.g., acidic solution). This contacting step involves wet mixing.

Wet mixing (solid/liquid mixing) may be carried out using a mixer selected from the group consisting of a kneading mixer, a screw mixer, a cone mixer, a plow mixer, a ribbon blender, a pan Muller mixer, a stirring tank, a helical-blade mixer, an extruder (such as a Rietz, single-screw, or double-screw extruder), and any combinations thereof. Any mixer being suitable for paste mixing or viscous material mixing would be suitable for wet mixing according to such embodiment of the present invention.

In some additional or alternate embodiment wherein the method comprises forming an aqueous suspension, slurry or solution containing the additive(s), the contacting step may comprise spraying the aqueous solution or slurry or suspension containing the additive(s) onto the sodic fly ash with optionally additional water or an aqueous medium (e.g., acidic solution).

The sodic fly ash mass may be in motion during spraying to allow even distribution of additives(s) onto the sodic fly ash mass. For example, the mass of sodic fly ash may be in motion on a moving surface (e.g., conveyor), in motion due to the rotation of a ribbon, screw or blade, or tumbling in a rotating vessel while the solution or suspension or slurry comprising one or more additives is sprayed onto the moving sodic fly ash mass.

It is envisioned that more than one contacting technique may be employed during a step for contacting the sodic fly ash with the same additive or for contacting the sodic fly ash with different additives.

It is also envisioned that the same contacting technique may be employed for contacting the sodic fly ash with different additives, either simultaneously or sequentially.

Contacting may take place for a time period of no less than 10 minutes and/or of no more than 12 hours. Contact time between 15 minutes and 1 hour is generally suitable.

Contacting may take place at a temperature of less than 100° C. A temperature greater than 0° C. and less than 100° C., or from 10° C. to about 70° C., preferably from 15° C. to about 50° C. A temperature between 4 and 45° C., more preferably between 10 and 30° C., would be suitable for this contacting step.

In preferred embodiments, contacting excludes a phosphatation and/or a sulfidation.

In alternate embodiments, the method may further include a phosphatation by using a phosphate-containing compound as a further additive. The phosphatation may be carried out at the same time as during contacting. The phosphatation and the contacting may be carried out sequentially.

In other embodiments, the method may further include a sulfidation by using a sulfide-containing compound (e.g., $Na_2S$) as a further additive component. The sulfidation may be carried out at the same time as during contacting. The sulfidation and the contacting may be carried out sequentially.

Before carrying out the drying, the material obtained during contacting may be optionally formed into shapes, for example extruded or molded into one or more forms such as in the form of pellets, granules, bricks, briquettes, or the like.

In a particularly preferred embodiment of the present method, in which a water-soluble source comprising sodium silicate is used as an additive, the method may include diluting a concentrated sodium silicate solution (generally containing from 30 to 40 wt % sodium silicate) with either water or an acidic aqueous solution to achieve a sodium silicate content of from 1 to 10 wt %, preferably from 2 to 5 wt % in the diluted solution; optionally adding another additive component (such as ferric sulfate, ferric chloride, strontium chloride, or combinations thereof) to this diluted sodium silicate solution; spraying or misting the diluted sodium silicate solution onto a mass of sodic fly ash (or a dry blend of sodic fly ash and Ca-containing additive) with is either motionless (such as in a heap or pile or spread on a liner) or which is moving (such as on a conveyor belt), the amount of the diluted additive solution being sufficient to not exceed the liquid holding capacity of fly ash, and preferably to approach within 5%, preferably within 3% of the value for the liquid holding capacity or even more preferably to reach the liquid holding capacity of the sodic fly ash. The sprayed or misted sodic fly ash (or a dry blend of sodic fly ash and Ca-containing additive) may be collected to be placed in a container or moved such as to landfill or a clinker process for re-use. In some embodiments, the diluted sodium silicate solution applied to the sodic fly ash (or a dry blend of sodic fly ash and Ca-containing additive) may have a temperature from 10° C. to about 70° C., preferably from 15° C. to about 50° C. The diluted sodium silicate solution may be pre-heated before contacting the sodic fly ash (or a dry blend of sodic fly ash and Ca-containing additive). Alternatively, the water or acidic solution used to dilute the concentrated sodium silicate solution may have a temperature already within the preferred temperature range provided above, or may be pre-heated before dilution.

The weight ratio of sodium silicate to the material containing calcium may vary depending on the heavy metals and calcium content of the sodic fly ash. Typical weight of sodium silicate to such material may range from 1:100 to 4:1, preferably from 5:100 to 1:1, more preferably from 8:100 to 2:5.

The method is preferably carried out on a sodic fly ash having a low calcium oxide content, such as less than 8 wt %. This type of fly ash is typically classified as 'type F'.

Drying

In some embodiments of the present invention, the method further comprising: drying the material obtained after contacting with the at least one additive. Drying may be carried out at a temperature of more than 100° C. and/or less than 150° C. The objective of the drying step is to remove the water from the material which is resulting from the contacting. The water removed in drying step is free water, and the mechanism for water removal during drying is evaporation.

Drying time will vary depending on the amount of water used during the contacting step. Drying time is typically at least 5 minutes, preferably at least 30 minutes, and at most 12 hours. A drying time between 20 minutes and 6 hours is suitable when the water content in the material obtained in contacting step is between 20 and 40 wt %. A drying time between 30 minutes and 3 hours is preferred.

Drying preferably takes place in air, but may take place under an inert (non-reactive) atmosphere such as nitrogen.

Drying may be indirect drying in which a heat transfer fluid having a temperature greater than the material to be dried is heating a surface and the material to be dried is then dried by contact with the heated surface (but without being in contact with the heat transfer fluid).

Drying may be direct drying in which a fluid having a temperature greater than the material to be dried (such as hot air) is brought in contact with the material to be dried.

Drying may take place at atmospheric pressure or under vacuum to facilitate the removal of water from the material to be dried.

The drying is preferably carried out without calcining or sintering the contacted material resulting from contacting step. In particular, drying excludes heating the material obtained from contacting step at a temperature exceeding 500° C. Preferably, drying should not comprise conditions which favor the volatilization of heavy metals (such as Se and/or As) contained in the contacted material resulting from contacting step.

The dried matter may contain less than 50% of leachable heavy metal (such as selenium and/or arsenic) than the initial sodic fly ash before the treatment with the additive.

The dried matter resulting from drying step preferably contains 1 ppm or less of leachable Se.

In some embodiments, the method may comprise successive contacting steps ($a_n$) with optionally one or more drying or partial drying steps (b') carried out between contacting steps ($a_n$), and a final drying step (b). The additive(s) used in the contacting steps ($a_n$) may be the same additive applied in several portions or may be different additives. The successive contacting steps ($a_n$) may employ the same contacting technique; or different contacting techniques may be used in successive contacting steps ($a_n$). At least one of the successive contacting steps ($a_n$) uses an additive comprising a water-soluble source of silicate.

In some particular embodiments in which two or more additives are contacted with the sodic fly ash in separate contacting steps ($a_n$), the method may comprise:

(a1) contacting the sodic fly ash with a first additive in the presence of water, (b') optionally drying the contacted material resulting from step (a1) to form a first partially-dried or dried matter;

(a2) contacting the contacted sodic fly ash resulting from step (a1) or the partially-dried/dried matter formed in optional step (b') with a second additive optionally in the presence of additional water;
(b) drying the material resulting from step (a2) to form a final dried matter;
wherein the first and second additives are different.

The techniques for contacting in steps (a1) and (a2) may be the same or different. The optional additional water in step (a2) may be in the form of pure water or an aqueous medium (e.g., an acidic solution).

In some alternate embodiments in which the same additive is contacted with the sodic fly ash using more than one contacting step (a), the method may comprise:
(a1') contacting the sodic fly ash with a first portion of an additive in the presence of water,
(b') optionally drying the material resulting from step (a1') to form a partially-dried or dried matter;
(a2') contacting the contacted sodic fly ash resulting from step (a1') or the partially-dried/dried matter formed in optional step (b') with a second portion of the same additive optionally in the presence of additional water;
(b) drying the material resulting from step (a2') to form a final dried matter;
wherein the contacting steps (a1') and (a2') may use the same contacting technique or different contacting techniques.

The optional additional water in step (a2') may be in the form of pure water or an aqueous medium (e.g., an acidic solution).

A yet alternate embodiment of the present invention relates to a method for treating a sodic fly ash to form a treated material which is suitable for landfill or valorization.

Such embodiment of the method preferably includes the contacting step with at least one additive as previously described. The contacting step is preferably carried out in the presence of water, but the contacted mass of fly ash is still in 'dry' state and the amount of water used does not typically exceed the water holding capacity of the sodic fly ash. The contacting is preferably carried out with a water amount not to exceed the water holding capacity of the sodic fly ash, and preferably sufficient to be within +/−5% of the water holding capacity of the sodic fly ash. The additive used for the stabilization preferably comprises a Ca-containing compound and optionally at least one other additive component as previously described. The additive is added in an amount sufficient to stabilize sodium. The additive may be also sufficient to stabilize at least one heavy metal initially present in the sodic fly ash before treatment. The resulting material obtained from such stabilization step has a much reduced leachability of sodium compared to the sodic fly ash before the treatment with the additive.

Because the stabilization is expected to be carried out primarily by converting at least a portion of the sodium into a water-insoluble form, the method may further comprise: washing the treated fly ash—preferably obtained after the contacting step(s)—with a washing medium (e.g., water or an aqueous medium) so as to dissolve most of the water-soluble fraction of the treated sodic fly ash. Because water is used in such washing step, it is recommended not to dry the material obtained in contacting step before washing. As such, in this particular embodiment, such method may omit the drying step.

The water-soluble fraction in a sodic fly ash may comprise up to 60 wt % of the sodic fly ash. Typical ranges of water-soluble content in sodic fly ashes may be from about 5 wt % up to about 50 wt % based on the total weight of the sodic fly ash. The soluble fraction of the treated sodic fly ash may still comprise water-soluble sodium salts. 'Spent sorbent' generally refers to the reaction mixture obtained in a dry sodium-based injection and this spent sorbent is collected in the fly ash material. This spent sorbent contains reaction products and byproducts (such as highly water-soluble sodium sulfate, sodium sulfite, sometimes sodium bisulfate), and also unconverted sodium-based sorbent such as sodium bicarbonate and/or sodium carbonate. At least a portion of the water soluble fraction of the treated sodic fly ash may be dissolved in the subsequent washing step by dissolution into the washing medium (water or acidic medium).

The end (treated and washed) material obtained by this two-step treatment would have a reduced $Na_2O$ content. If this end material does not exceed the environment regulatory levels for heavy metals, then the treated and washed material may be suitable for landfilling. And if this end material further does not exceed the maximum content of $Na_2O$ (generally maximum of 1.5 wt % of combined $Na_2O$+ $K_2O$) according to ASTM C 618, then this end material may be valorized, for example in cement and concrete manufacturing.

The present invention having been generally described, the following Examples are given as particular embodiments of the invention and to demonstrate the practice and advantages thereof. It is understood that the examples are given by way of illustration and are not intended to limit the specification or the claims to follow in any manner.

EXAMPLES

Example 1

Treatment with Various Additives to Reduce Se Leachability

Determination of Liquid Holding Capacity of a Sodic Fly Ash D: The liquid holding capacity of a sodic fly ash D was measured by adding water to 20 grams of fly ash until it formed a soft malleable paste. This was found to be equivalent to 34.2% by weight of fly ash D.

Treatment: One additive was either dissolved or dispersed in 6.5 grams of deionized water. More than one additive may be dissolved or dispersed in the deionized water. This slurry or suspension was then added to 19 grams of fly ash. The resulting paste was stirred as much as possible with a spatula and allowed to dry at 110° C. for 2 hours.

The additives used in Example 1 were strontium chloride, strontium hydroxide, sodium silicate, dolomitic lime pulverized (DLP), combination of DLP and sodium silicate, and combination of strontium chloride and sodium silicate.

The sodium silicate solution (40-42 degree Baume) was obtained from Aqua Solutions (Deer Park, Tex.).

The dolomitic lime pulverized with ca. 4-micron sized particles was from Grupo Calider, Monterrey, Mexico.

To prepare the strontium chloride additive, 0.93 g (or 0.37 g) of strontium carbonate (Solvay CPC Barium Strontium Monterrey standard grade) using 0.6 g (or 0.24 g) concentrated HCl were diluted to 6.5 g with deionized water. A portion of this solution was added to 19 g of fly ash to reach a content of 5 wt % (or 2 wt %) $SrCl_2$.

Strontium Hydroxide was supplied by Solvay CPC Barium Strontium, Monterrey. In addition, to freshly prepare the strontium hydroxide additive, strontium sulfide (SrS) was mixed with sodium hydroxide, and a selective precipitation of strontium hydroxide took place which allowed the recovery of strontium hydroxide from sodium sulfide ($Na_2S$). The obtained strontium hydroxide was then diluted with water to add to a fly ash sample to be treated.

TABLE 1

| Additive(s) | wt % | Extraction | Se** (ppm) extracted | % reduction in Se leachability |
|---|---|---|---|---|
| — | — | Water* | 3.1 | — |
| — | — | Acidic water | 2.3 | 26.1 |
| $Sr(OH)_2$ | 5% | Acidic water | 1.6 | 49 |
| Sodium silicate | 5% | Acidic water | 0.54 | 83 |
| Dolomitic Lime Pulverized (DLP) | 5% | Acidic water | 0.46 | 86 |
| $Sr(OH)_2$ + Sodium silicate | 2% 2% | Acidic water | 0.43 | 87 |
| DLP + Sodium silicate | 2% 2% | Acidic water | 0.03 | 100 |
| Sodium silicate | 2% | Acidic water | 0.03 | 100 |
| $SrCl_2$ | 5% | Acidic water | 0.03 | 100 |
| $SrCl_2$ + Sodium Silicate | 2% 2% | Acidic water | 0.03 | 100 |

\* = measured 0.03 ppm Se in extraction water
\*\*measured by ICP

Extraction (leaching test): 18 grams of the resulting dried treated material was dispersed in 100 grams of deionized water or diluted hydrochloric acid solution (7 g HCl in 93 g water) of a pH of about 3.5. The resulting slurry was stirred with a magnetic stirrer for 10 minutes. The slurry was filtered with a syringe filter using 0.1-micron Whatman membrane filter. This clear extract was used directly for selenium analysis. The results on the reduction of Se leachability using the treatment method according to the present invention can be found in TABLE 1.

Example 2

Treatment with Concentrated Sodium Silicate Solution to Reduce Se, as Leachability Two sodic fly ash samples E and F were obtained by injecting trona in a flue gas generated by combustion of a Permian coal (sub-bituminous). The sodic fly ash E had about 12 wt % of spent sorbent (water-soluble sodium salts), whereas the sodic fly ash F had about 21 wt % of spent sorbent.

A control fly ash Z was also obtained with the same Permian coal but without injecting trona in a flue gas.

Treatment: a sodium silicate solution of 40 wt % was applied to a mass of sodic fly ash E or control fly ash Z. The water added for the contacting step was the water present in the solution of sodium silicate. After 10 to 15 minutes of contact, the contacted mass was allowed to dry. The amounts used in the treatment step according to an embodiment of the present invention can be found in TABLE 2.

TABLE 2

| Ex. | Fly ash sample | fly ash (g) | Sodium silicate solution 40% A.I. (g) | Sodium silicate used (g) | Water added [from solution] (g) | Sodium silicate (wt %*) | Water added (wt %*) |
|---|---|---|---|---|---|---|---|
| 4a | Z (control) | 100 | — | | | 0 | 0 |
| 4b | Z (control) | 98 | 2 | 0.8 | 1.2 | 0.8% | 1.2% |
| 4c | Z (control) | 95 | 5 | 2 | 3 | 2% | 3% |
| 4d | E | 100 | — | | | 0 | 0 |
| 4e | E | 98 | 2 | 0.8 | 1.2 | 0.8% | 1.2% |
| 4f | E | 95 | 5 | 2 | 3 | 2% | 3% |
| 4g | F | 100 | — | | | 0 | 0 |
| 4h | F | 95 | 5 | 2 | 3 | 2% | 3% |

*based on total weight of fly ash + sodium silicate + water

The results on the reduction of Se and As leachability using the treatment method according to this embodiment of the present invention can be found in TABLE 3. As and Se leachability were analyzed according to the TCLP method (Toxicity Characteristic Leaching Procedure) using an inductive couple plasma analyzer.

For the control fly ash Z (non-sodic fly ash), it was observed that the leachability of Se and As was increased with the addition of a concentrated sodium silicate solution and a total water content of 1.2 and 3 wt %. This increase in leachability was indeed quite significant for selenium in the control fly ash sample.

For the sodic fly ashes E and F, it was observed that the leachability of Se and As was decreased with the addition of a concentrated sodium silicate solution. The effect was more pronounced with arsenic than for selenium. However the leachate level of Se was already quite low at about 0.29 and 0.3 ppm (see untreated samples 4d and 4g). So it is believed that the beneficial effect of sodium silicate solution depends on the initial levels of the leachable heavy metals. For leachate levels of 0.3 ppm or less, the beneficial effects of such treatment may not be as good as with higher leachate levels.

On the other end, the leachability of As content was reduced from 1.1 ppm in the leachates of untreated samples 4d and 4g (without sodium silicate addition) by 22% to 73% in the leachates of treated samples (4e, 4f, 4h).

TABLE 3

| Ex. | Fly ash sample | fly ash (g) | Sodium silicate solution 40% A.I. (g) | Sodium silicate (wt %*) | Water added (wt %*) | Se (ppm) | % change in leachability for As | As (ppm) | % change in leachability for As |
|---|---|---|---|---|---|---|---|---|---|
| 4a | Z (control) | 100 | — | — | — | 0.066 | | 0.021 | |
| 4b | Z (control) | 98 | 2 | 0.8% | 1.2% | 0.085 | 28.8 | 0.068 | 223.8 |

TABLE 3-continued

| Ex. | Fly ash sample | fly ash (g) | Sodium silicate solution 40% A.I. (g) | Sodium silicate (wt %*) | Water added (wt %*) | Se (ppm) | % change in leachability for As | As (ppm) | % change in leachability for As |
|---|---|---|---|---|---|---|---|---|---|
| 4c | Z (control) | 95 | 5 | 2% | 3% | 0.062 | −6.1 | 0.053 | 152.4 |
| 4d | E | 100 | — | — | — | 0.290 |  | 1.100 |  |
| 4e | E | 98 | 2 | 0.8% | 1.2% | 0.270 | −6.9 | 0.850 | −22.7 |
| 4f | E | 95 | 5 | 2% | 3% | 0.260 | −10.3 | 0.470 | −57.3 |
| 4g | F | 100 | — | — | — | 0.300 |  | 1.100 |  |
| 4h | F | 95 | 5 | 2% | 3% | 0.270 | −10.0 | 0.360 | −67.3 |

*based on total weight of fly ash + sodium silicate + water

Example 3

Treatment with Diluted Sodium Silicate Solution to Reduce Se, as Leachability

The same two sodic fly ash samples E and F used in Example 2 were used in Example 3.

Treatment: a sodium silicate solution of 40 wt % was first diluted with water to achieve a total water content of 13 wt % based on the total weight of the fly ash+sodium silicate solution+water mixture. The total amount of water used for the contacting step was the water present in the solution of sodium silicate and the additional water used to dilute the sodium silicate solution. After 10 to 15 minutes of contact, the contacted mass was allowed to dry. The amounts used in the treatment step according to this embodiment of the present invention can be found in TABLE 4.

The results on the reduction of Se and As leachability using the treatment method according to this embodiment of the present invention can be found in TABLE 5. As and Se leachability were analyzed according to the TCLP method (Toxicity Characteristic Leaching Procedure) using an inductive couple plasma analyzer.

TABLE 4

| Ex. | Fly ash sample | Wt. of Coal (g) | Sodium silicate solution 40% A.I. (g) | Sodium Silicate (g) | Water [from solution] (g) | additional water (g) | sodium silicate (wt %*) | water content (wt %*) |
|---|---|---|---|---|---|---|---|---|
| 5a | E | 100 | 0 | 0 | 0 | 15 | 0% | 13% |
| 5b | E | 99 | 1 | 0.4 | 0.6 | 14.4 | 0.35% | 13% |
| 5c | E | 98 | 2 | 0.8 | 1.2 | 13.8 | 0.71% | 13% |
| 5d | E | 95 | 5 | 2 | 3 | 12 | 1.77% | 13% |
| 5e | E | 90 | 10 | 4 | 6 | 9 | 3.54% | 13% |
| 5f | F | 100 | 0 | 0 | 0 | 15 | 0% | 13% |
| 5g | F | 95 | 5 | 2 | 3 | 12 | 1.77% | 13% |
| 5h | F | 90 | 10 | 4 | 6 | 9 | 3.54% | 13% |

*based on total weight of fly ash + sodium silicate + water

TABLE 5

| Ex. | Fly ash sample | Wt. of Coal (g) | Sodium silicate solution 40% A.I. (g) | sodium silicate (wt %*) | water content (wt %*) | Se (ppm) | % change in leachability for Se | As (ppm) | % change in leachability for As |
|---|---|---|---|---|---|---|---|---|---|
| 5a | E | 100 | 0 | 0% | 13% | 0.32 |  | 1.2 |  |
| 5b | E | 99 | 1 | 0.35% | 13% | 0.31 | −3.1 | 0.67 | −44.2 |
| 5c | E | 98 | 2 | 0.71% | 13% | 0.29 | −9.4 | 0.47 | −60.8 |
| 5d | E | 95 | 5 | 1.77% | 13% | 0.3 | −6.3 | 0.34 | −71.7 |
| 5e | E | 90 | 10 | 3.54% | 13% | 0.2 | −37.5 | 0.25 | −79.2 |
| 5f | F | 100 | 0 | 0% | 13% | 0.3 |  | 1 |  |
| 5g | F | 95 | 5 | 1.77% | 13% | 0.3 | 0.0 | 0.26 | −74.0 |
| 5h | F | 90 | 10 | 3.54% | 13% | 0.26 | −13.3 | 0.21 | −79.0 |

*based on total weight of fly ash + sodium silicate + water

For the sodic fly ashes E and F, it was observed that the leachability of Se and As was decreased with the addition of a dilute sodium silicate solution. The reduction in leachability was again more pronounced with arsenic than for selenium. However the leachate level of Se was already quite low at about 0.30 and 0.32 ppm (see untreated samples 5a and 5f). So it is believed that the beneficial effect of sodium silicate solution on heavy metals' leachability depends on the initial levels of the leachable heavy metals.

On the other end, the leachability of As was reduced from 1 or 1.2 ppm in the leachates of untreated samples 5a and 5f (without sodium silicate addition) by 44% to 79% in the leachates of treated samples (5b-e, 5g).

On the other end, the sodium leachability of Na may be controlled by adding LKD—see leachates of treated samples 6e, 6f, 6h (with LKD addition) which showed a slight reduction in leachability in Na.

As such, it is expected that the addition of LKD to a sodic fly ash which is treated with sodium silicate may be beneficial not only to decrease leachability of heavy metals such as As and Se but also in preventing increasing the sodium leachability from the treated sodic fly ash.

TABLE 6

| Ex. | Fly ash sample | LKD (wt %*) | Sodium (ppm) | % change in leachability for Na | Se (ppm) | % change in leachability for Se | As (ppm) | % change in leachability for As |
|---|---|---|---|---|---|---|---|---|
| 6a | Z (control) | — | 17 | — | 0.066 | — | .021 | — |
| 6b | Z (control) | 5 | 15 | −12% | 0.003 | −95.5% | .004 | −81% |
| 6c | Z (control) | 10 | 26 | +53% | 0.002 | −97.0% | .007 | −66.7% |
| 6d | E | — | 2000 | — | 0.32 | — | 1.2 | — |
| 6e | E | 5 | 1700 | −15% | 0.29 | −9.4% | 0.73 | −39.2% |
| 6f | E | 10 | 1700 | −15% | 0.26 | −18.8% | 0.45 | −62.5% |
| 6g | F | — | 3400 | — | 0.3 | — | 1 | — |
| 6h | F | 10 | 3200 | −6% | 0.28 | −6.7% | 1 | 0% |

*based on total weight of fly ash + sodium silicate + water

Example 4

Treatment with Lime Kiln Dust

Lime kiln dust (LKD) was used to treat the same fly ash samples E and F used in Example 3 that were obtained by injecting trona in a flue gas generated by combustion of a Permian River Basin coal (sub-bitumous). The sodic fly ash E had about 12 wt % of Na (water-soluble sodium salts), whereas the sodic fly ash F had about 21 wt % of Na. The same control fly ash Z was also used as a control. For this test a high shear mixer was sued to make the blends to efficient blend water, ash and the stabilizing chemical.

This study was made to study the impact of high sodium levels on the stabilization of the sodic coal fly ash. The results on the reduction of Se and As leachability using the treatment method according to this embodiment of the present invention can be found in TABLE 6. As and Se leachability were analyzed according to the TCLP method (Toxicity Characteristic Leaching Procedure) using an inductive couple plasma analyzer.

For the control fly ash Z (non-sodic fly ash), it was observed that the leachability of Se and As was much decreased with 5 and 10 wt % LKD ranging from 66.7% to 97% reduction in leachability. This decrease in leachability was indeed quite significant for selenium in the control fly ash sample. However the initial Se and As contents were already quite low.

For the sodic fly ashes E and F however, it was observed that the impact on leachability of Se and As (in term of %) was not as high as for non-sodic fly ash. The reduction in leachability was more pronounced with arsenic than for selenium especially for sodic fly ash E.

Example 5

Treatment with Sodium Silicate or Lime Kiln Dust of a Bituminous Coal Fly Ash

Lime kiln dust (LKD) or sodium silicate were used to treat two fly ash samples G and H that were obtained by blending a bituminous fly ash X and a spent sorbent generated by combustion of a subbituminous coal with the injection of trona for flue gas mitigation. The spent sorbent had a selemium content of 0.28 ppm Se compared to 0.02 ppm Se in the trona sorbent. Selenium indeed reacted with trona in the flue gas duct where trona was injected to form sodium selenate resulting in more selenium in the fly ash and there was an elevated leaching from sodium capture of selenium. The sodic fly ash G had about 12 wt % of Na (water-soluble sodium salts), whereas the sodic fly ash H had about 21 wt % of Na. The same bituminous fly ash X was also used as a control.

The contacting step with the coal fly ash and LKD or sodium silicate included 15% water.

TABLE 7

| Fly ash sample | Sodium silicate wt % | LKD wt % | As (ppm) | Se (ppm) | Na (ppm) |
|---|---|---|---|---|---|
| X (0% Na) | 0 | 0 | 0.011 | 0.002 | 41 |
|  | 0 | 5 | 0.017 | 0.001 | 28 |
|  | 0 | 10 | 0.019 | 0.002 | 36 |
|  | 0 | 0 | 0.015 | 0.003 | 32 |
|  | 0.4 | 0 | 0.014 | 0.005 | 52 |
|  | 0.8 | 0 | 0.022 | 0.032 | 310 |
|  | 2 | 0 | 0.015 | 0.016 | 180 |
|  | 4 | 0 | 0.015 | 0.008 | 95 |
| G (12% Na) | 0 | 0 | 0.025 | 0.35 | 1500 |
|  | 0 | 5 | 0.022 | 0.24 | 1500 |
|  | 0 | 10 | 0.001 | 0.23 | 1400 |
|  | 0 | 0 | 0.1 | 0.5 | 2000 |

TABLE 7-continued

| Fly ash sample | Sodium silicate wt % | LKD wt % | As (ppm) | Se (ppm) | Na (ppm) |
|---|---|---|---|---|---|
|  | 0.4 | 0 | 0.25 | 0.59 | 2200 |
|  | 0.8 | 0 | 0.11 | 0.55 | 2200 |
|  | 2 | 0 | 0.75 | 0.67 | 2300 |
|  | 4 | 0 | 1.2 | 0.69 | 2300 |
| H | 0 | 0 | 1.6 | 1 | 3300 |
| (21% Na) | 0 | 0 | 0.32 | 0.78 | 2900 |
|  | 0 | 10 | 0.036 | 0.62 | 2900 |
|  | 0.4 | 0 | 1.7 | 0.99 | 3500 |
|  | 0.8 | 0 | 1.8 | 1.1 | 3500 |
|  | 2 | 0 | 1.8 | 0.9 | 3400 |
|  | 4 | 0 | 2.2 | 1 | 3500 |

The results on the reduction of Se and As leachability using the treatment method according to this embodiment of the present invention can be found in TABLE 7. As and Se leachability were analyzed according to the TCLP method (Toxicity Characteristic Leaching Procedure) using an inductive couple plasma analyzer.

In the fly ash sample X with no sorbent when sodium silicate or LKD were added, leachability slightly increased.

With the fly ash sample G with 12% sodium, the metals leachability increased without additive; however with the addition of 10% LKD, the leachability was below the baseline coal ash.

When greater amounts of sodium silicate were added, the leachability continued to increase. Increasing the spent sorbent content from 12% Na to 21% Na increased the leachability with this type of fly ash.

It was observed that for bituminous ash low in calcium, the addition of LKD was effective at lowering selenium and arsenic leachability and thus was very effective in stabilizing metals. It is expected that other calcium-containing materials such as hydrated lime or cement kiln dust would be also effective at lowering selenium and arsenic leachability. Local availability may dictate the most cost effective material to use for such stabilization.

Example 6

Proctor Test

Proctor Analysis of test samples were conducted to help understand the effects of ash with sodium, relating to ash placement in a landfill. Typical Proctor Test can be found in Standard Proctor method ASTM D 698 or Modified Proctor method ASTM D 1557.

The baseline Permian River Basin (BBR) coal ash used in Example 4 (Sample Z) had a Maximum Dry Density (MDD) of 80.8 lb/ft$^3$ at an Optimum Moisture (OM) of 20.8%. These values were obtained before trona injection into the flue duct.

But with a content of 12% Na from a spent sorbent (see Sample G used in Example 4), the same Sample Z ash had a Maximum Dry Density (MDD) of 84.7 lb/ft$^3$ at an Optimum Moisture (OM) of 17.3%.

So with Permian River Basin coal ash (Sample Z), sodium presence increased the Maximum Dry Density and lowered the amount of moisture required. But without the additive, the issue of sodium leaching from an ash pile was not addressed.

The mixture of bituminous ash with 21% spent sodium sorbent which was used in Example 5 (see Sample H) achieved a Maximum Dry Density (MDD) of 94.7 lb/ft$^3$ at an Optimum Moisture (OM) of 19.8%.

On the other end, the same bituminous ash with Trona containing 21% Na and 10% LKD achieved a Maximum Dry Density (MDD) of 99.6 lb/ft$^3$ at an Optimum Moisture (OM) of 19.3%.

The addition of LKD to high sodium bituminous ash increased the MDD and slightly lowered the OM slightly.

From this data, it can be concluded that sodium in fly ash did not negatively affect the fly ash Maximum Dry Density. It seems that the presence of Na typically results in a higher MDD and a lower OM than fly ash without added Na. This would result in a denser material being placed in the landfill with less water being used for ash conditioning.

The disclosure of all patent applications, and publications cited herein are hereby incorporated by reference, to the extent that they provide exemplary, procedural or other details supplementary to those set forth herein. Should the disclosure of any of the patents, patent applications, and publications that are incorporated herein by reference conflict with the present specification to the extent that it might render a term unclear, the present specification shall take precedence.

Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

Accordingly, the scope of protection is not limited by the description and Examples set out above, but is only limited by the claims which follow, that scope including all equivalents of the subject matter of the claims.

The invention claimed is:

1. A treatment method for stabilizing of a sodic fly ash, wherein the sodic fly ash is provided by a combustion process in which a sodium-containing sorbent is injected into a flue gas generated during combustion to remove at least a portion of pollutants contained in the flue gas, said treatment method comprising:
    contacting said sodic fly ash with at least one additive comprising calcium to form a stabilized material, and
    drying the material obtained after the contacting step, wherein said drying is carried out at a temperature equal to or more than 100° C. and equal to or less than 150° C., without calcining or sintering the material resulting from the contacting step,
    wherein said at least one additive comprising calcium comprises one material selected from the group consisting of lime kiln dust, fine limestone, quicklime, hydrated lime, dolomitic lime, dolomite, selectively calcined dolomite, hydrated dolomite, and any mixture of two or more thereof, and
    wherein said sodic fly ash has a Na content greater than 1.5 wt % expressed as Na$_2$O.

2. The method according to claim 1, wherein said at least one additive comprises one material selected from the group consisting of lime kiln dust, dolomitic lime, dolomite, selectively calcined dolomite, hydrated dolomite, and any mixture of two or more thereof.

3. The method according to claim 1, wherein said sodic fly ash has a Na content of less than 50 wt % expressed as $Na_2O$.

4. The method according to claim 1, wherein said sodic fly ash has a Ca content less than 8 wt % calcium oxide.

5. The method according to claim 1, further comprising first blending the at least one additive containing calcium with said sodic fly ash to form an initial blend and then adding water to said resulting initial blend.

6. The method according to claim 1, wherein contacting uses a water content to form a paste comprising the at least one additive and said sodic fly ash, and wherein the paste contains at most 40 wt % water.

7. The method according to claim 6, wherein the paste contains between 1 wt % and 35 wt % water.

8. The method according to claim 1, wherein contacting takes place at a temperature of from 10° C. to less than 100° C.

9. The method according to claim 1, further comprising contacting the sodic fly ash with a second additive selected from the group consisting of one water-soluble source of silicate, strontium hydroxide, strontium chloride, ferric sulfate, ferric chloride, and any combination of two or more thereof.

10. The method according to claim 9, wherein said second additive is at least one water-soluble source of silicate selected from the group consisting of sodium silicate, potassium silicate, or any combination thereof.

11. The method according to claim 10, wherein said second additive is sodium silicate, and wherein the weight ratio of sodium silicate to the material containing calcium ranges from 5:100 to 1:1.

12. The method according to claim 1, wherein the sodic fly ash before contacting contains at least one sodium compound selected from the group consisting of sodium carbonate, sodium sulfate, sodium sulfite, sodium chloride, sodium fluoride, one or more sodium compounds containing at least one heavy metal to be stabilized, and any combination of two or more thereof.

13. A treatment method for stabilizing of a sodic fly ash, wherein the sodic fly ash is provided by a combustion process in which a sodium-containing sorbent is injected into a flue gas generated during combustion to remove at least a portion of pollutants contained in the flue gas, said treatment method comprising:
contacting said sodic fly ash with at least one additive comprising calcium to form a stabilized material, wherein contacting takes place for a time period of no less than 10 minutes and/or of no more than 12 hours,
wherein said at least one additive comprising calcium comprises one material selected from the group consisting of lime kiln dust, fine limestone, quicklime, hydrated lime, dolomitic lime, dolomite, selectively calcined dolomite, hydrated dolomite, and any mixture of two or more thereof, and
wherein said sodic fly ash has a Na content greater than 1.5 wt % expressed as $Na_2O$.

14. The method according to claim 13, wherein said at least one additive comprises one material selected from the group consisting of lime kiln dust, dolomitic lime, dolomite, selectively calcined dolomite, hydrated dolomite, and any mixture of two or more thereof.

15. The method according to claim 13, further comprising contacting the sodic fly ash with a second additive selected from the group consisting of one water-soluble source of silicate, strontium hydroxide, strontium chloride, ferric sulfate, ferric chloride, and any combination of two or more thereof.

16. The method according to claim 13, further comprising drying the material obtained after the contacting step, wherein said drying is carried out at a temperature equal to or more than 100° C. and equal to or less than 150° C., without calcining or sintering the material resulting from the contacting step.

17. A method for increasing the dry bulk density of sodic fly ash while minimizing water usage to control fly ash dusting, wherein the sodic fly ash is provided by a combustion process in which a sodium-containing sorbent is injected into a flue gas generated during combustion to remove at least a portion of pollutants contained in the flue gas, wherein said sodic fly ash has a Na content greater than 1.5 wt % expressed as $Na_2O$, said method comprising:
contacting said sodic fly ash with at least one additive comprising calcium to form a stabilized material, and
drying the material obtained after the contacting step,
wherein said drying is carried out at a temperature equal to or more than 100° C. and equal to or less than 150° C.,
wherein said at least one additive comprising calcium comprises one material selected from the group consisting of lime kiln dust, fine limestone, quicklime, hydrated lime, dolomitic lime, dolomite, selectively calcined dolomite, hydrated dolomite, and any mixture of two or more thereof, and
wherein the contacting step uses a water content to form a paste comprising the at least one additive and said sodic fly ash, and wherein the paste contains at most 40 wt % water.

18. The method according to claim 17, wherein said at least one additive comprises lime kiln dust.

19. The method according to claim 17, wherein said at least one additive comprises one material selected from the group consisting of lime kiln dust, dolomitic lime, dolomite, selectively calcined dolomite, hydrated dolomite, and any mixture of two or more thereof.

20. The method according to claim 17, further comprising contacting the sodic fly ash with a second additive selected from the group consisting of sodium silicate, potassium silicate, and combination thereof.

* * * * *